(12) United States Patent
Smith et al.

(10) Patent No.: US 6,260,874 B1
(45) Date of Patent: Jul. 17, 2001

(54) HITCH COVER

(75) Inventors: K. Wayne Smith, Elkhorn; Daniel G. Baughman, Fontana; Ricki Charles Finch, Whitewater, all of WI (US)

(73) Assignee: Bergamot Incorporated, Delavan, WI (US)

( * ) Notice: Subject to any disclaimer, the term of this patent is extended or adjusted under 35 U.S.C. 154(b) by 0 days.

(21) Appl. No.: 09/460,967

(22) Filed: Dec. 14, 1999

(51) Int. Cl.[7] ....................................................... B60D 1/60
(52) U.S. Cl. ............................................ 280/507; D12/162
(58) Field of Search ................................. 280/506, 507; D12/162

(56) References Cited

U.S. PATENT DOCUMENTS

| | | | |
|---|---|---|---|
| D. 326,834 | * | 6/1992 | Kuhlemeier et al. ............... D12/162 |
| D. 399,805 | * | 10/1998 | Donalies .............................. D12/162 |
| D. 405,744 | * | 2/1999 | Young et al. ....................... D12/162 |
| 4,040,641 | * | 8/1977 | Riecke ................................ 280/507 |
| 5,603,178 | * | 2/1997 | Morrison ............................... 40/591 |
| 6,007,033 | * | 12/1999 | Casson et al. ..................... 248/224.7 |

OTHER PUBLICATIONS

Hitch Buckle Internet Printout dated May 11, 1999, (2 pages).
Hitch Ware Internet Printout dated Sep. 2, 1999 (1 page).
Herrington The Enthusiasts' Catalog,, Fall 1999, p. 51 (2 pages including cover page).

* cited by examiner

*Primary Examiner*—Kevin Hurley
(74) *Attorney, Agent, or Firm*—Foley & Lardner

(57) ABSTRACT

A hitch cover includes a face plate and a wire form attached thereto for being inserted into the hitch tube and securing the face plate across the open end of the hitch tube. A lock or pin extending through the conventional hitch tube openings, passing through the wire form prevents removal of the hitch cover and protects against rattling of the wire from within the tube.

20 Claims, 4 Drawing Sheets

HITCH COVER

CROSS-REFERENCE TO RELATED APPLICATION IF ANY:

None.

BACKGROUND OF THE INVENTION

1. Field of the Invention

The present invention relates generally to the art of covers for hitches used to tow trailers, boats and the like behind cars, trucks, sports utility vehicles (SUV), etc. More specifically, the present invention relates to a hitch cover which may be easily inserted and locked into a hitch tube and which may be manufactured inexpensively using a wire form to hold a face plate over the rear opening of the tube. In its most preferred embodiment, the invention relates to a wire form pivotally attached to the rear surface of the face plate (or a component thereof), the wire form being deformed as it is inserted into the tube so that the spring forces of the wire form will hold the hitch cover in place and prevent rattling of the hitch cover during use of the vehicle.

2. Description of the Prior Art

Hitches attached to cars, trucks, sports utility vehicles and the like are commonplace. They typically include a hitch tube permanently mounted to the vehicle and a hitch bar which is inserted into the tube and locked thereto, usually with a pin or lock extending through openings on opposed walls of the tube. A ball is mounted at or near the outer end of the bar and is used to mount the trailer or other device to be towed by the vehicle. Several standard sized hitch tubes are encountered in most car, light truck and SUV applications, designated as Class II and Class III. The former has an inner tube opening which is a one and one-quarter inch (1¼") square, and the latter has an inner tube opening which is also square but with two inch sides.

The hitch tubes include a rearwardly oriented opening which receives the hitch bar. In some hitches the opening is a simple extension of a square piece of tubing, while in other models the opening is surrounded by a flange, a plate or some other component of the vehicle or the hitch tube mounting structure. The opening, while functionally necessary, is not attractive when the hitch bar is removed, and it detracts from the overall aesthetics of the rear of the vehicle. As a result, it has been suggested that covers be provided for the hitch tube opening.

Several styles of covers are currently available, ranging from simple smooth, black plastic devices that are frictionally inserted at the very end of the hitch tube, to very expensive decorative covers. One known decorative cover includes a face plate having a planar rear surface and a flat plate extending from a central location on the rear of the plate. The plate is inserted into the hitch tube until a hole in the plate is aligned with openings in the opposed side walls of the hitch tube, at which time a pin or lock is inserted through the assembly to retain the hitch cover in place. This known hitch cover is cast as a single, integral piece, and accordingly, it is expensive. It furthermore suffers from a problem of rattling unless the hole and pin or lock alignment is nearly perfect.

Another known hitch cover includes a multi-component assembly which is attached to the rear of a face plate. This device is illustrated in the Internet print-out submitted with the application for this patent and entitled HITCH BUCKLE Product Line (dated May 11, 1999). This complex, multi-component product is also expensive and requires assembly before installation.

HITCHWARE™ solid cast aluminum billet hitch covers are illustrated in the accompanying Internet print out dated Sep. 2, 1999. It is believed that the mounting component of this product is a cast, solid square box inserted into the hitch tube with a hole therethrough for alignment with the holes of the hitch tube. This device, due to its construction, is also costly to produce and expensive to buy, thus reducing its attractiveness to impulse buying consumers.

Other hitch covers including tube stock mountings are shown at page 51 of Herrington's, The Enthusiasts' Catalog, Fall 1999, a copy of which is supplied with the application for this patent. These polished, billet aluminum devices are expensive and beyond the price level of impulse buyers who desire an attractive hitch cover.

As seen above, a variety of hitch cover products are currently available, but none of them are sturdy, decorative and inexpensive to manufacture, such that more consumers will be able to afford them. The development of a rugged, inexpensive, rattle-free, reliable and decorative hitch cover would represent a significant advance in this art.

FEATURES AND SUMMARY OF THE INVENTION

A principle feature of the present invention is to provide a rugged, inexpensive, preferably rattle-free, reliable and decorative hitch cover which overcomes the disadvantages of the prior art hitch covers discussed above.

Another feature of a preferred embodiment of the present invention is to provide a wire form mounting for the decorative face plate of a hitch cover.

A different feature of the present invention is to provide a readily deformable wire form mounting for the decorative face plate of a hitch cover which holds the hitch cover within a hitch tube in a secure, rattle-free manner.

A still further feature of the present invention is to provide a mounting system for hitch covers which may readily be adapted for different sizes of hitch tubes and different shapes of face plates.

Another feature of the present invention is to provide a hitch cover which is easy to package, display and ship in a nearly flat arrangement.

A further feature of the present invention is to provide a hitch cover which is sufficiently inexpensive to the end user to permit the end user to purchase several different hitch covers having different decorative displays, e.g. seasonal displays or displays involving different sports, hobbies, etc.

How these and further features of the present invention are accomplished will be described in the following detailed description of a preferred and two alternate embodiments, taken in conjunction with the FIGURES. Generally, however, the features are accomplished by providing a decorative face plate of a hitch cover which may have a variety of shapes, but preferably including a generally planar rear surface. A wire form is coupled to the face plate, the wire form most preferably being made from spring steel and being deformed when it is inserted into the hitch tube, so that the hitch cover will be held firmly in the hitch tube due to the outwardly directed spring forces of the wire form acting on the inner surface of the hitch tube. In alternate embodiments, this feature is eliminated, but a wire form is still used. In its illustrated preferred embodiment the wire form is rotatably coupled to the back of the face plate and includes a generally U-shape adapted to slide along diagonal corners of the hitch tube when it is inserted. The face plate may include a raised rim on the rear surface arranged to slidingly fit within the end of the hitch tube and a sealing/cushioning member (such as an O-ring or gasket) may be provided to prevent rattling of the plate against the hitch tube. In the preferred embodiment, the wire form is designed so that a conventional pin or lock will be captured within the wire form to prevent removal thereof unless the pin or lock is withdrawn. Other ways in which the features of the present invention are accomplished will become apparent to those skilled in the art after the present specification has been reviewed. Such other ways are deemed to fall within the scope of the present invention if they fall within the scope of the claims which follow.

DESCRIPTION OF THE DRAWINGS

In the various FIGURES, like reference numerals are used to indicate like components.

DETAILED DESCRIPTION OF THE PREFERRED AND AN ALTERNATE EMBODIMENT

Figure 1:
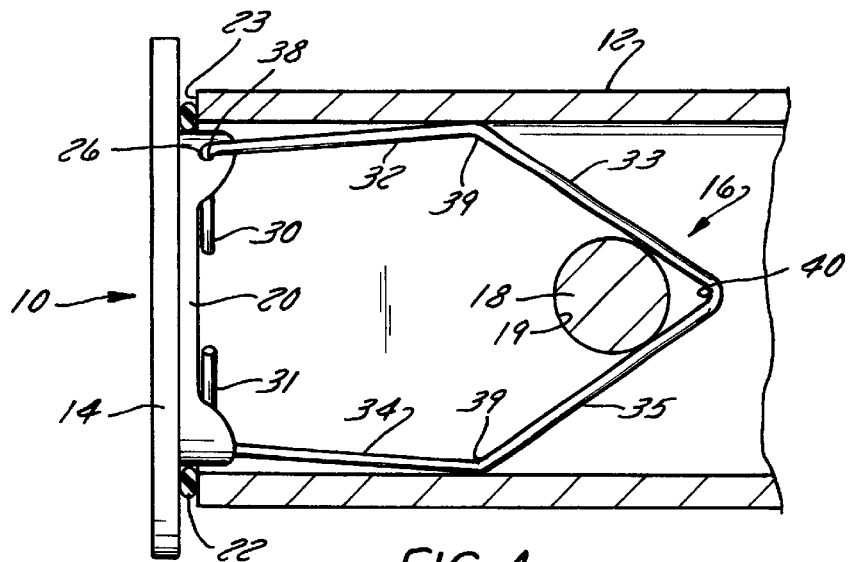
FIG. 1 is a side view of the preferred embodiment of the hitch cover of the present invention, with a hitch tube shown in phantom line for purposes of illustrating important features of the wire form contained therein.

Before proceeding to a detailed description of the preferred and an alternate embodiment of the present invention, several general comments can be made about the applicability and the scope of the present invention.

First, the shape of the face plate may be selected from any of a variety of shapes, such as circles, ovals, squares, rectangles, other polygon shapes, as well as irregular shapes, such as, but not by way of limitations, animal or fish shapes, the shapes of buildings, sporting equipment, states, vehicles, etc.

Second, while the face plate is preferably decorative, it can be plain. Suitable decorations include, without limitation, names, logos, graphic or pictorial representatives of animals, fish, vehicles, slogans, etc. Furthermore, such decorative face plates may be made by any known process such as painting or printing. Decorative face plates which are prepared in relief from metals, such as pewter, and which are made by casting processes, are most preferred.

Third, the size of the face plate can also vary widely, the size preferably being large enough to fully cover the opening or mouth of the hitch tube.

Fourth, the material used for the face plate can be selected from the group of materials comprising metals, alloys and plastics. The wire form component, on the other hand, is preferably made from spring wire, such as stainless steel wire, having sufficient strength to hold the hitch cover in place, be deformable without the use of excessive force to permit attachment of the hitch cover to the hitch tube, and desirably be made from a non-corrosive material due to the corrosive environment found in and around the hitch of a vehicle.

Fifth, the illustrated configuration for the wire form is preferred, but other forms may be employed, including forms made from more than a single strand of wire. The primary requirements for any wire form are that it be capable of attachment to the face plate, that it deform under a resilient or spring force so that it can be inserted into a hitch tube and that it have elastic or spring memory operating against the interior of the hitch tube to resist removal of the hitch cover and prevent rattling of the wire form with respect to the hitch tube. alternately, the wire form should be capable of being captured by the hitch pin, in which case the spring force requirement is not essential.

Sixth, a common O-ring is illustrated in the FIGURES to act as a cushioning/sealing material between the hitch tube and the face plate. Other devices such as gaskets can be used, and whatever the form, the cushioning/sealing material should preferably be resilient, elastic, weatherproof and inexpensive to manufacture.

Seventh, the way in which the wire form is attached to the face plate can be accomplished differently than the rotatable connection using holes and bent wire form ends illustrated for the preferred and the alternate embodiment. For example, ends of the wire form can be captured in channels provided in the face plate and a cover can be applied thereover. The wire form could also be welded or otherwise securely and rigidly attached to the rear of the face plate without departing from the invention's intended scope.

Finally, it should be indicated that in all the illustrated embodiments the rear of the wire form, i.e. its end furthest from the face plate, is designed to extend just past the location of the hitch tube defined by the opposed side holes therein. In this way, a standard pin or lock will be captured by the wire form when the pin or lock is fully inserted, adding security to the overall device and further preventing rattling of the wire form within the hitch tube. However, the invention also contemplates wire forms which extend beyond the pin or lock location, so that only the security benefit is provided by the pin or lock and the anti-rattle result is achieved through appropriate design of the wire form itself.

Figure 3:
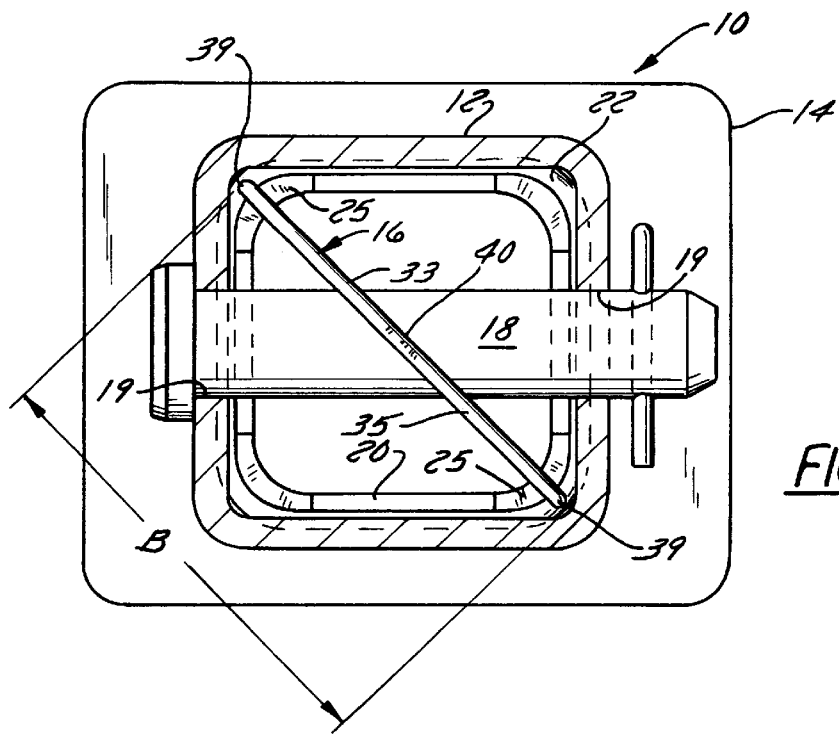
FIG. 3 is a sectional view taken along the line 3—3 of FIG. 1.

Proceeding now to the description of the preferred and two alternate embodiments of the invention, FIG. 1 shows a hitch cover 10 according to the preferred embodiment coupled to a hitch tube 12. Hitch cover 10 includes a face plate 14 and a wire form 16 attached thereto as will become more apparent hereafter. FIGS. 1 and 3 also shows a hitch pin or lock 18 extending through a pair of aligned apertures 19 in hitch tube 12, the pin or lock 18 extending through the wire form 16 at a location remote from face plate 14. It will be apparent from this introduction that the pin or lock 18 will prevent removal of the hitch cover 10 unless it is first removed. Pins and locks used to secure hitch bars to a hitch tube are well known, and further details do not need to be provided as they do not, in and of themselves, form part of the present invention.

Figure 2:
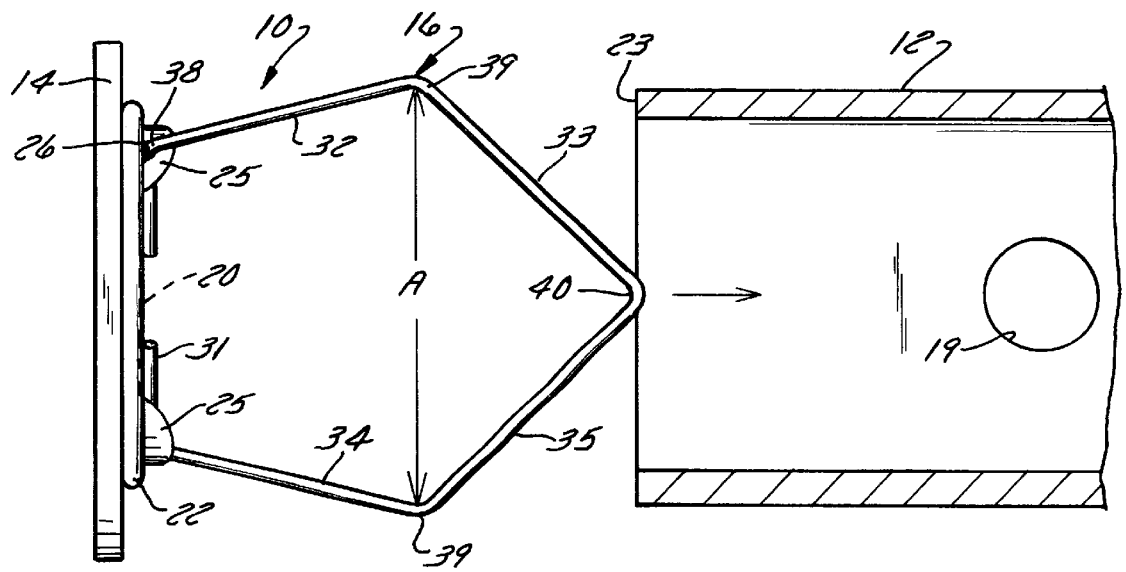
FIG. 2 is an exploded side view of the hitch cover and hitch tube shown in FIG. 1.
Figure 4:
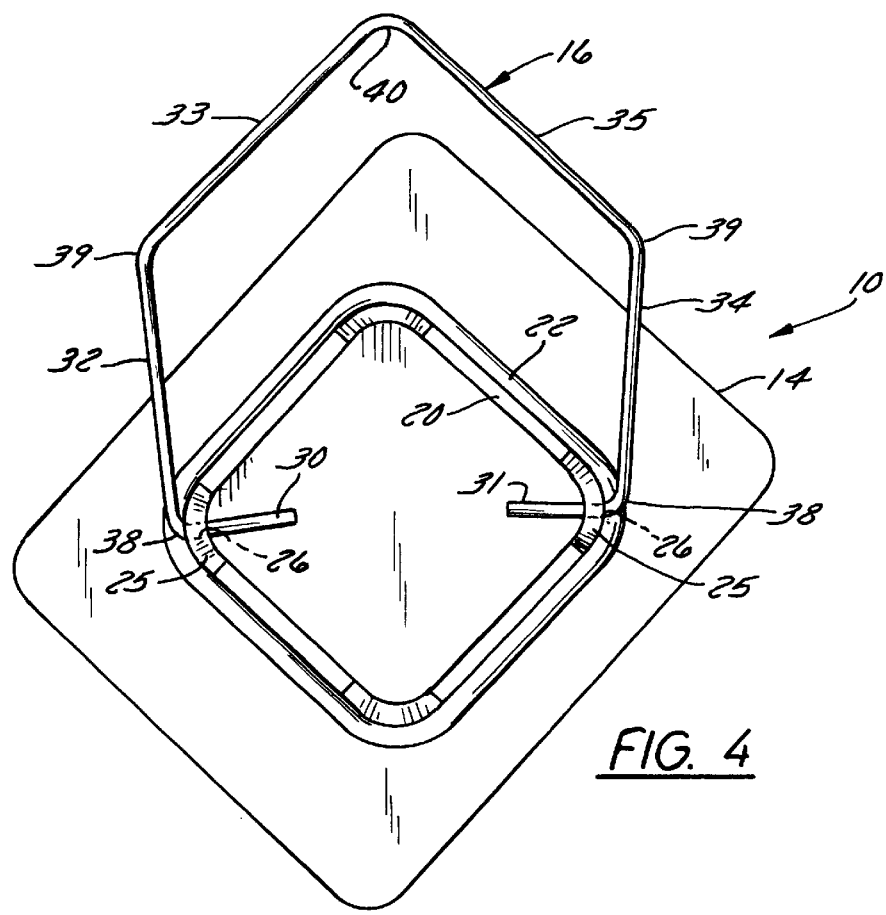
FIG. 4 is a rear elevational view of the face plate of the hitch cover shown in FIG. 1, with the wire form folded to its storage and/or shipment position.

FIG. 2 is a side, exploded view of certain of the components shown in FIG. 1 and together with FIG. 4 clearly show the wire form 16 and how it is attached to face plate 14. Face plate 14 in the preferred embodiment includes a generally square rim 20 constructed and arranged to fit within hitch tube 12. In its most preferred form, the fit of rim 20 within tube 12 is snug.

In addition a cushioning/sealing member 22, for example a neoprene O-ring, is stretched or placed around the rim 20. It will be appreciated then that when the wire form 16 is inserted into hitch tube 12, the cushioning/sealing member 22 will lie against the end face 23 of the hitch tube 12 and will both prevent rattling of the face plate 14 and seal the end 23 of the hitch tube 12 from environmental contaminants.

The coupling of wire form 16 can best be appreciated by reference to FIGS. 2 and 4 which show wire form 16 rotatably coupled to a pair of ears 25 on opposed corners of rim 20 by having portions 30 and 31 of the wire form 16 extend through holes 26 in the ears 25.

Wire form 16 is preferably constructed from a single strand of spring wire, such as 313 stainless steel wire, 0.0915 gauge, available from Industrial Steel and Wire Company, 19101 North Narrogausett Avenue, Chicago, Ill., U.S.A. Portions 30 and 31 are formed by bending the ends of the wire strand at about a 90° angle indicated by reference numeral 38. Extending from portions 30 and 31 are portions 32 and 33 which diverge outwardly with respect to the bends 38, for a distance of approximately 1–2 inches (depending on the size of the interior of hitch tube 12, i.e. the class of the hitch tube), where the wire is bent at an obtuse angle 39. The last of the wire form portions 34 and 35 converge to an acute angle bend 40 at the approximate mid-point of the wire strand.

Referring especially to FIG. 2, it will be noted that the distance "A" between the obtuse angle bends 39 exceeds slightly the diagonal distance "B" (see FIG. 3) between opposed corners of the inside of the hitch tube 12. To insert the hitch cover 10 into the hitch tube 12 it will be necessary to exert a force on face plate 14 causing the obtuse angle bends 39 to approach one another slightly. Once they enter the hitch tube 12 they will slide along opposed corners under spring resistance due to the outwardly directed spring forces of wire form 16.

As is now apparent from the description to this point, the angle bend 40 should be located far enough from the rear surface of face plate 14 that the pin or lock 18 can be inserted within the wire form, most preferably very near the angle bend 40. While anti-rattle of the wire form 16 is provided by the spring forces, it is also assisted by the preferred location of the angle bend 40 with respect to the pair of tube openings 18.

Figure 5:
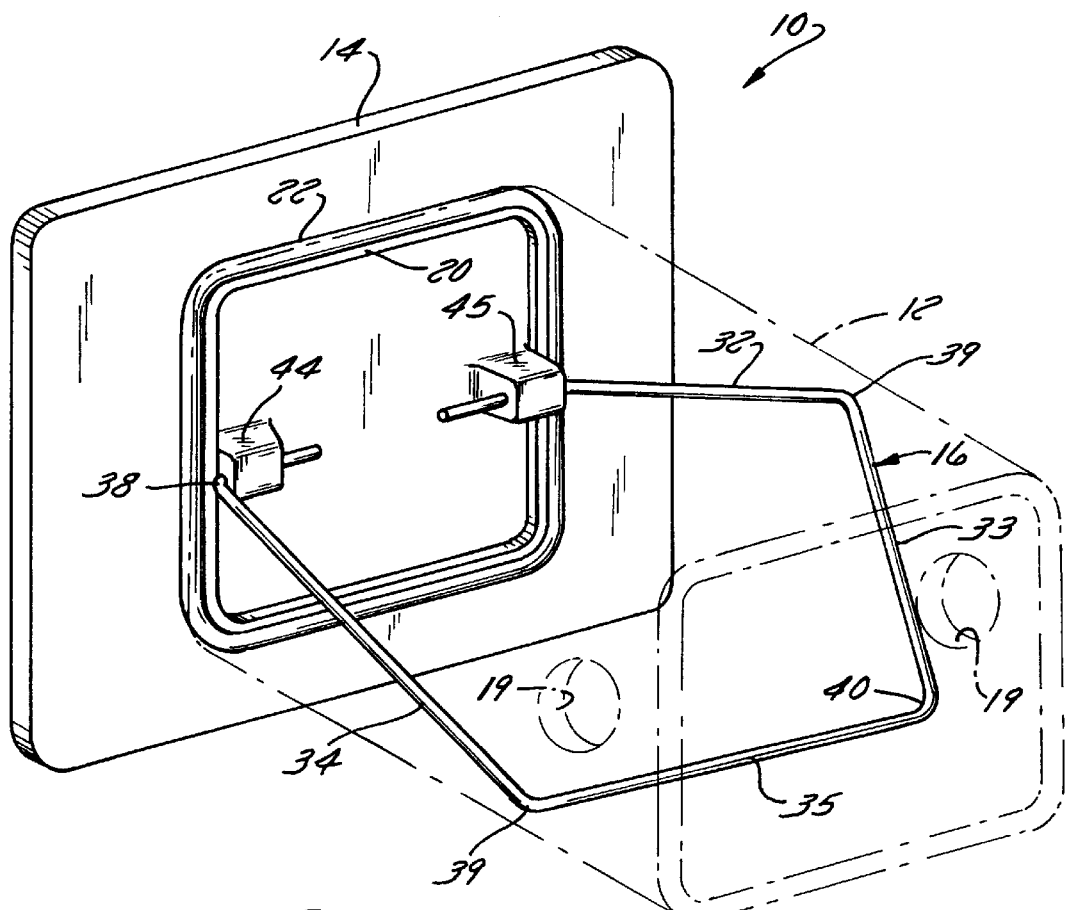
FIG. 5 is a rear perspective view of an alternate embodiment of the present invention showing a different wire form attachment technique.

An alternate embodiment of the invention is shown in FIG. 5, in which most of the components are the same, except that instead of having the attachment ears 25 located at corners of rim 20, separate perforated lugs 44–45 are located within the area defined by rim 20.

Figure 6:
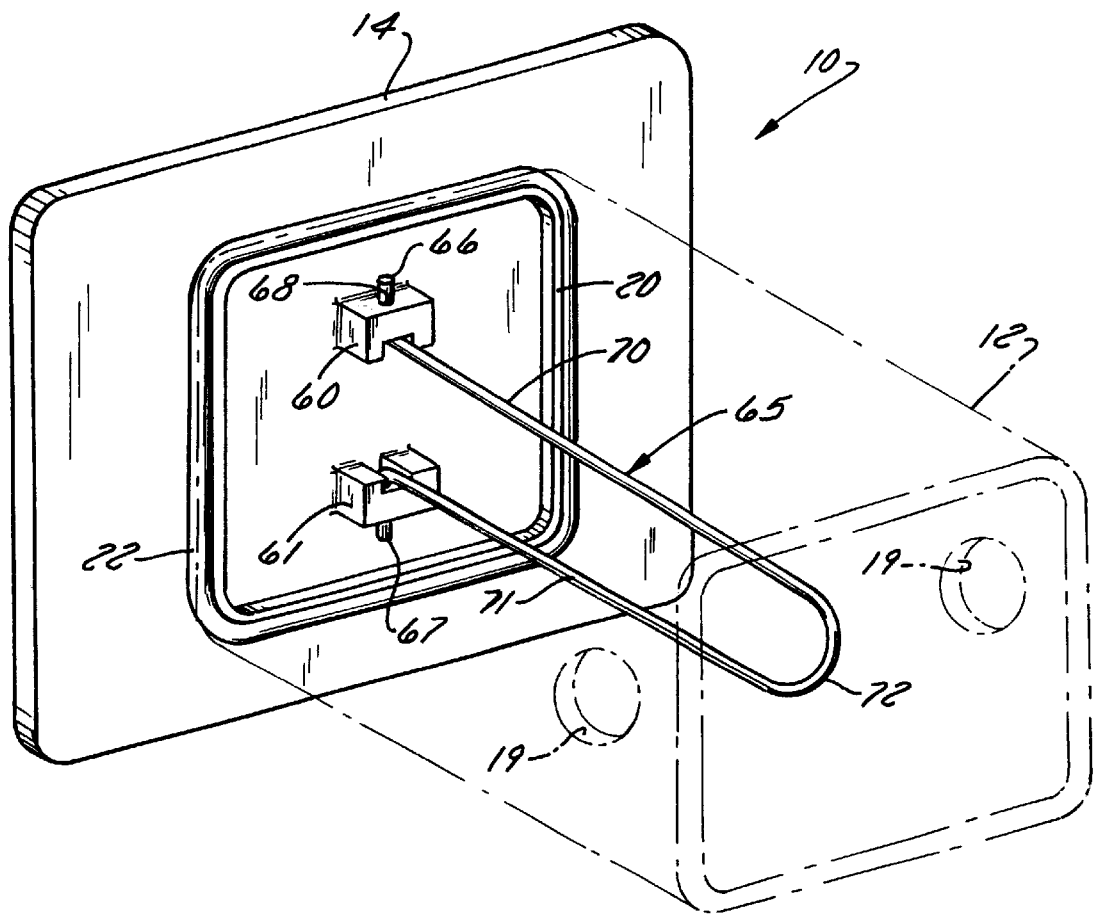
FIG. 6 is a rear perspective of another embodiment of the invention in which the spring force feature is eliminated, but the wire form benefits are still included.

Another alternate embodiment is shown in FIG. 6 where a pair of lugs 60 and 61 are provided on the rear of face plate 14 and a generally U-shaped wire form 65 is coupled thereto, through apertures 68 in the lugs 60 and 61. The wire form includes bent ends 66, 67, a pair of legs 70 and 71 and a U-shaped end 72. In the illustrated embodiment, the end 72 is located so that the hitch pin (not shown) can pass through the wire form 65 and prevent unauthorized removal of hitch cover 10. In this embodiment, the wire form 65 does not touch the inner walls of the hitch tube 12, so the spring properties of the wire form are not critical to the selection of suitable wire form material.

Reference is again directed to the introduction to this portion of the specification to provide a fuller understanding of the scope of the invention with respect to materials, shapes, dimensions, coupling techniques, wire form configurations, etc. In addition, while the invention has been described with reference to only a single preferred and a single alternate form of the invention, the scope thereof is not to be limited to such description but is to be limited solely by the scope of the claims which follow.

What is claimed is:

1. A hitch cover and a hitch tube which includes an interior square passageway having a diagonal interior dimension and an open end, the hitch cover comprising:
    a face plate; and
    a resiliently deformable spring wire form coupled to the face plate and having at least one dimension exceeding the diagonal dimension of the hitch tube, the wire form being constructed and arranged to be deformed and inserted into the hitch tube by compressing the wire form and the wire form being restrained within the hitch tube by outwardly directed spring forces.

2. The hitch cover and tube of claim 1 wherein the face plate includes a square rim on the rear surface adapted to be inserted into the open end of the hitch tube.

3. The hitch cover and tube of claim 2 wherein the rim includes a pair of holes and the wire form is rotatably inserted through the holes so that it is pivotally coupled to the face plate.

4. The hitch cover and tube of claim 3 wherein the rim includes a pair of ears on opposed corners, the holes being located in the ears.

5. The hitch cover and tube of claim 2 wherein a cushioning/sealing member surrounds the rim.

6. The hitch cover and tube of claim 5 wherein the cushioning/sealing member comprises an O-ring.

7. The hitch cover and tube of claim 1 wherein the wire form includes a single strand of spring wire bent at an acute angle near its middle, bent at about a 90° angle near each end and bent at an obtuse angle between the acute angle and each end.

8. The hitch cover and tube of claim 7 wherein the distance between the two obtuse angle bends exceeds the diagonal dimension of the hitch tube.

9. The hitch cover and tube of claim 1 wherein the face plate includes a pair of lugs, each lug having a hole therethrough and wherein the wire form is rotatably coupled to the face plate through the holes in the lugs.

10. A hitch tube and cover system comprising:
    an elongate hitch tube having a polygonal interior passageway, an open end and a pair of aligned openings in the wall of the hitch tube, the openings being spaced apart from the open end, the hitch tube having a maximum dimension between a pair of non-adjacent corners of the interior passageway;
    a hitch cover comprising a face plate having a front and a rear, the face plate having a size greater than the open end of the hitch tube; and
    a resiliently deformable wire form coupled to the rear of the face plate and having a dimension exceeding the maximum dimension, whereby the wire form can only be inserted in the interior passageway by deforming the wire form, and wherein the wire form is at least partially retained in the hitch tube by the outwardly directed resilient forces of the wire form.

11. The system of claim 10 wherein a hitch pin or lock is inserted through the aligned openings and through the wire form, whereby the hitch cover may not be removed from the hitch tube unless the pin or lock is removed.

12. The hitch cover of claim 10 wherein the face plate includes a square rim on the rear thereof adapted to be inserted into the open end of the hitch tube.

13. The hitch cover of claim 12 wherein the rim includes a pair of holes and the wire form is rotatably inserted through the holes so that it is pivotally coupled to the face plate.

14. The hitch cover of claim 13 wherein the rim includes a pair of ears on opposed corners, the holes being located through the ears.

15. The hitch cover of claim 12 wherein a cushioning/sealing member surrounds the rim.

16. The hitch cover of claim 15 wherein the cushioning/sealing member comprises an O-ring.

17. The hitch cover of claim 10 wherein the wire form includes a single strand of spring wire bent at an acute angle near its middle, bent at about a 90° angle near each end and bent at an obtuse angle between the acute angle and each end.

18. The hitch cover of claim 17 wherein the distance between the two obtuse angle bends exceeds the maximum dimension of the hitch tube.

19. The hitch cover of claim 10 wherein the face plate includes a pair of lug, each lug having a hole therethrough and wherein the wire form is rotatably coupled to the face plate through the holes in the lugs.

20. A hitch cover for a hitch tube, the hitch cover comprising:

a face plate having a front and a rear;

a hitch tube having a pair of aligned hitch pin openings;

a U-shaped wire form rotatably coupled to the rear of the face plate and extending therefrom so that a U-shaped connection of the wire form is arranged about a line extending between the hitch pin openings; and the wire form being arranged in such a way that a hitch pin extending through the hitch pin openings would pass through the wire form and prevent removal of the hitch cover from the hitch tube.

\* \* \* \* \*